(12) United States Patent
Chang et al.

(10) Patent No.: US 10,368,413 B1
(45) Date of Patent: Jul. 30, 2019

(54) LIGHT SOURCE MODULE AND ADJUSTMENT METHOD THEREOF

(71) Applicants: LITE-ON ELECTRONICS (GUANGZHOU) LIMITED, Guangzhou (CN); Lite-On Technology Corporation, Taipei (TW)

(72) Inventors: Kuo-Hui Chang, Taipei (TW); Kuan-Yu Chen, Taipei (TW); Yao-Chi Peng, Taipei (TW); Ming-Hung Chien, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/243,098

(22) Filed: Jan. 9, 2019

(30) Foreign Application Priority Data

Nov. 2, 2018 (TW) .............................. 107138914 A (51) Int. Cl.
*H05B 33/00* (2006.01)
*H05B 33/08* (2006.01)
*F21V 8/00* (2006.01)

(52) U.S. Cl.
CPC ......... *H05B 33/0851* (2013.01); *G02B 6/009* (2013.01); *G02B 6/0036* (2013.01); *G02B 6/0055* (2013.01); *G02B 6/0068* (2013.01)

(58) Field of Classification Search
CPC ....... H01L 2924/00014; H01L 2924/00; H01L 2924/0002; H01L 33/22; H01L 33/58; H01L 31/02363; H01L 31/0543; H01L 2224/05624; H01L 2224/05644; H01L 2224/05655; H01L 2224/05664; H01L 2224/05666; H01L 2224/05671;
(Continued)

(56) References Cited

U.S. PATENT DOCUMENTS

2008/0121903 A1* 5/2008 Hiramatsu .......... H01L 21/0237 257/89
2016/0276514 A1* 9/2016 Simavoryan .......... H01L 31/055

FOREIGN PATENT DOCUMENTS

TW   201821729   6/2018
WO   2018158110  9/2018

OTHER PUBLICATIONS

"Office Action of Taiwan Counterpart Application," dated Mar. 6, 2019, p. 1-p. 9.

* cited by examiner

*Primary Examiner* — Monica C King
(74) *Attorney, Agent, or Firm* — JCIPRNET (57) ABSTRACT

A light source module including a casing, a light guide plate, at least one light emitting element, and a reflector is provided. The light guide plate includes a plate body and an optical microstructure array. The optical microstructure array is located at a top surface of the plate body and includes a plurality of microstructure units. The microstructure units are recessed from the top surface towards the bottom surface and are shaped as inverted square pyramids, and a pyramid portion of each of the inverted square pyramids is formed by at least four surfaces. Each of the microstructure units includes two opposite first surfaces and two opposite second surfaces arranged in an alternating manner. Further, in each of the microstructure units, angles included between the two first surfaces and the top surface are identical, and angles included between the two second surfaces and the top surface are identical.

23 Claims, 11 Drawing Sheets

(58) Field of Classification Search
CPC .. H01L 2224/05684; H01L 2224/48091; H01L 33/56; H01L 51/5275; H01L 31/0236; H01L 31/028; H01L 31/0547; H01L 33/20; H01L 21/2252; H01L 21/2254; H01L 21/268; H01L 2224/05099; H01L 31/02168; H01L 31/035281; H01L 31/068; H01L 31/18; H01L 31/1804; H01L 33/60; H01L 51/5281; H01L 21/0254; H01L 2224/16; H01L 2224/45144; H01L 27/14625; H01L 2924/12036; H01L 2924/12041; H01L 33/007; H01L 21/0243; H01L 21/02658; H01L 2224/05001; H01L 2224/05024; H01L 2224/05026; H01L 2224/05548; H01L 2224/13008; H01L 2224/48465; H01L 22/12; H01L 25/0753; H01L 27/146; H01L 27/14609; H01L 27/1462; H01L 27/14621; H01L 27/14623; H01L 27/14627; H01L 27/14629; H01L 27/14634; H01L 27/14636; H01L 27/1464; H01L 27/14643; H01L 27/14645; H01L 27/14659; H01L 27/14663; H01L 27/14667; H01L 27/14685; H01L 27/14812; H01L 2924/01046; H01L 2924/01078; H01L 2924/01079; H01L 2924/14; H01L 2924/19041; H01L 2924/3511; H01L 2933/0066; H01L 2933/0091; H01L 31/022441; H01L 31/02327; H01L 31/0248; H01L 31/0264; H01L 31/03529; H01L 31/03921; H01L 31/04; H01L 31/054; H01L 31/055; H01L 31/102; H01L 33/005; H01L 33/0079; H01L 33/32; H01L 33/44; H01L 33/62; H01L 21/0237; H01L 21/02458; H01L 21/0262; H01L 21/02642; H01L 21/02647; H01L 21/30608; H01L 2224/13; H01L 2224/32257; H01L 2224/48247; H01L 2224/48257; H01L 2224/48463; H01L 2224/49107; H01L 2224/73265; H01L 2224/83001; H01L 2224/92247; H01L 24/83; H01L 27/1443; H01L 27/1446; H01L 2924/15787; H01L 31/02; H01L 31/02245; H01L 31/022458; H01L 31/0232; H01L 31/02325; H01L 31/02366; H01L 31/03046; H01L 31/035218; H01L 31/048; H01L 31/0682; H01L 31/09; H01L 31/103; H01L 31/107; H01L 31/1075; H01L 31/1808; H01L 33/405; H01L 51/0035; H01L 51/4213; H01L 51/4226; H01L 51/5012

See application file for complete search history.

```
       ┌──────────────────────────────────────┐  ┌─ S200
       │ activating a light source module     │ ╱
       │ according to predetermined light     │
       │ type information                     │
       └──────────────────────────────────────┘
                        │
                        ▼
       ┌──────────────────────────────────────┐  ┌─ S210
       │ detecting a light emitting result of │ ╱
       │ the light source module              │
       └──────────────────────────────────────┘
                        │
                        ▼
       ┌──────────────────────────────────────┐  ┌─ S220
       │ adjusting a driving current of the   │ ╱
       │ light source module according to the │
       │ light emitting result                │
       └──────────────────────────────────────┘
```

FIG. 6

| first light emitting element (mA) | second light emitting element (mA) | driving current ratio | maximum light intensity angle (°) |
|---|---|---|---|
| 175 | 175 | 1:1 | 30 |
| 175 | 200 | 1:1.14 | 32 |
| 175 | 250 | 1:1.43 | 34.5 |
| 100 | 175 | 1:1.75 | 35 |
| 100 | 250 | 1:2.5 | 33.5 |

LIGHT SOURCE MODULE AND ADJUSTMENT METHOD THEREOF

CROSS-REFERENCE TO RELATED APPLICATION

This application claims the priority benefit of Taiwan application serial no. 107138914, filed on Nov. 2, 2018. The entirety of the above-mentioned patent application is hereby incorporated by reference herein and made a part of this specification.

BACKGROUND

Technical Field

The invention relates to an optical module and an adjustment method. More particularly, the invention relates to a light source module and an adjustment method.

Description of Related Art

The light emitted by a street lamp may have great brightness at certain angles. The light with such brightness is considerably different from the ambient light at night in terms of brightness and may thereby hurt the human eyes and lead to glare as a result. Pedestrians and drivers may thus face a dangerous situation. Therefore, how to lower the chance of glare so as to increase road safety for pedestrians or drives is an important issue.

SUMMARY

The invention provides a light source module and an adjustment method thereof capable of optimizing light type distribution a light beam transmitted from the light source module to be applied to various different types of road environments.

The invention provides a light source module including a casing, a light guide plate, at least one light emitting element, and a reflector. The casing has an internal space. The light guide plate is disposed in the internal space of the casing. The light guide plate includes a plate body and an optical microstructure array. The plate body has a top surface, a bottom surface, and a plurality of side surfaces connected between the top surface and the bottom surface. The optical microstructure array is located at the top surface and includes a plurality of microstructure units. The at least one light emitting element is disposed on the side surfaces of the plate body. The reflector is disposed on the top surface of the plate body. The microstructure units are recessed from the top surface towards the bottom surface and are shaped as inverted square pyramids, and a pyramid portion of each of the inverted square pyramids is formed by at least four surfaces. Each of the microstructure units includes two opposite first surfaces and two opposite second surfaces arranged in an alternating manner. In each of the microstructure units, angles included between the two first surfaces and the top surface are identical, and angles included between the two second surfaces and the top surface are identical.

In an embodiment of the invention, the microstructure units are arranged to be connected to one another.

In an embodiment of the invention, a height of the microstructure units is less than two-thirds of a thickness of the plate body.

In an embodiment of the invention, the two first surfaces or the two second surfaces are triangular-shaped, and the other ones are quadrilateral-shaped.

In an embodiment of the invention, the angles included between the two first surfaces and the top surface are different from the angles included between the two second surfaces and the top surface.

In an embodiment of the invention, the angles included between the two first surfaces and the top surface are different from each other or the angles included between the two second surfaces and the top surface are different from each other in different microstructure units.

In an embodiment of the invention, the angles included between the two first surfaces and the top surface or the angles included between the two second surfaces and the top surface change in different positions in different microstructure units.

In an embodiment of the invention, the two first surfaces and the two second surfaces are free-form curved surfaces.

In an embodiment of the invention, the two first surfaces or the two second surfaces are connected to each other, and the other ones are not connected to each other.

In an embodiment of the invention, the two first surfaces and the two second surfaces are connected to one another.

In an embodiment of the invention, each of the microstructure units further includes a third surface connected between the two first surfaces. The third surface is parallel to the top surface of the plate body.

In an embodiment of the invention, the at least one light emitting element includes a first light emitting element and two second light emitting elements, and the first light emitting element is located between the two second light emitting elements.

In an embodiment of the invention, light emitting intensity of each of the second light emitting elements is 1 to 3 times greater than light emitting intensity of the first light emitting element.

In an embodiment of the invention, the light source module further includes a controller adapted to individually control driving currents of the first light emitting element and the two second light emitting elements.

In an embodiment of the invention, the first light emitting element or each of the two second light emitting elements has a plurality of light emitting segments, and light emitting intensity of the light emitting segments is not completely identical.

In an embodiment of the invention, an edge of the top surface of the plate body is curved in a direction away from the bottom surface to form a first arc surface. An edge of the bottom surface is curved in a direction facing toward the top surface to form a second arc surface. The light source module further includes a reflection member disposed on the second arc surface.

The invention further provides an adjustment method of a light source module, and the adjustment method of the light source module includes the following steps. A light source module is activated according to predetermined light type information. A light emitting result of the light source module is detected. A driving current of the light source module is adjusted according to the light emitting result.

In an embodiment of the invention, the step of adjusting the driving current of the light source module according to the light emitting result further includes the following. The predetermined light type information is modified according to the light emitting result and adjusted light type information is generated. The driving current of the light source module is adjusted according to the adjusted light type information.

In an embodiment of the invention, the step of adjusting the driving current of the light source module according to the adjusted light type information further includes the following. Each driving currents of each of a plurality of light emitting elements in the light source module is adjusted.

In an embodiment of the invention, the step of adjusting each of the driving currents of each of the light emitting elements in the light source module further includes the following. Each driving currents of each of a plurality of light emitting segments in each of the light emitting elements is adjusted.

To sum up, the light source module provided by the invention includes the light guide plate, and the light guide plate has the microstructure units arranged in an array. Each of the microstructure units is formed by at least two opposite first surfaces and two opposite second surfaces and are recessed from the plate body, and the angles included between the first surfaces and the top surface of the plate body and the angles included between the second surfaces and the top surface of the plate body are different. In addition, in the adjustment method of the light source module provided by the invention, the light source module may be activated according to the predetermined light type information. The light emitting result of the light source module is detected so as to adjust the driving current of the light source module. In this way, the light type distribution of the light beam transmitted from the light source module is further optimized, and moreover, the light type distribution emitted by the light source module may be adjusted through the driving current, so the light source module may be applied to various different types of road environments.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
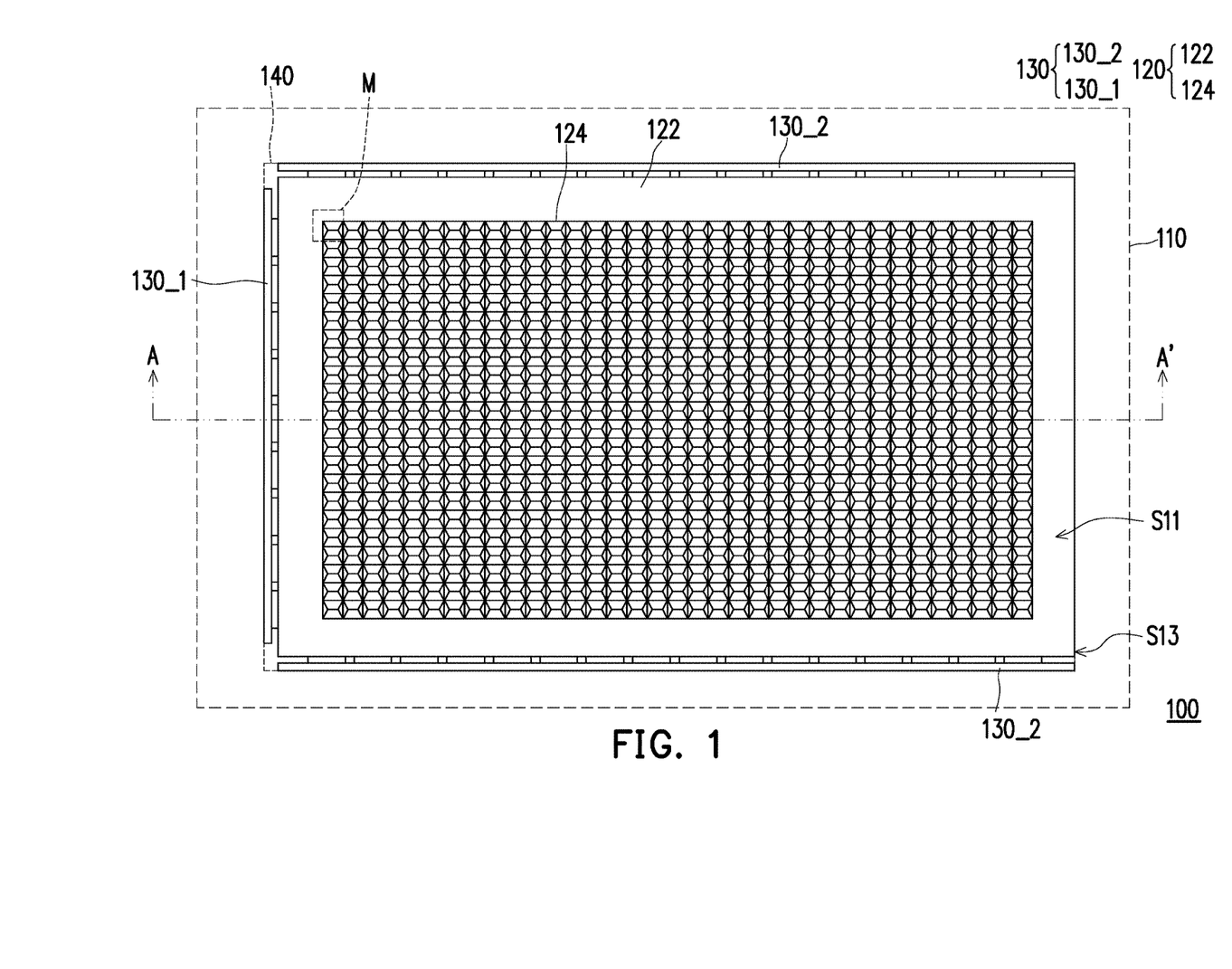
FIG. 1 is a schematic top view of a light source module according to an embodiment of the invention.
Figure 2:
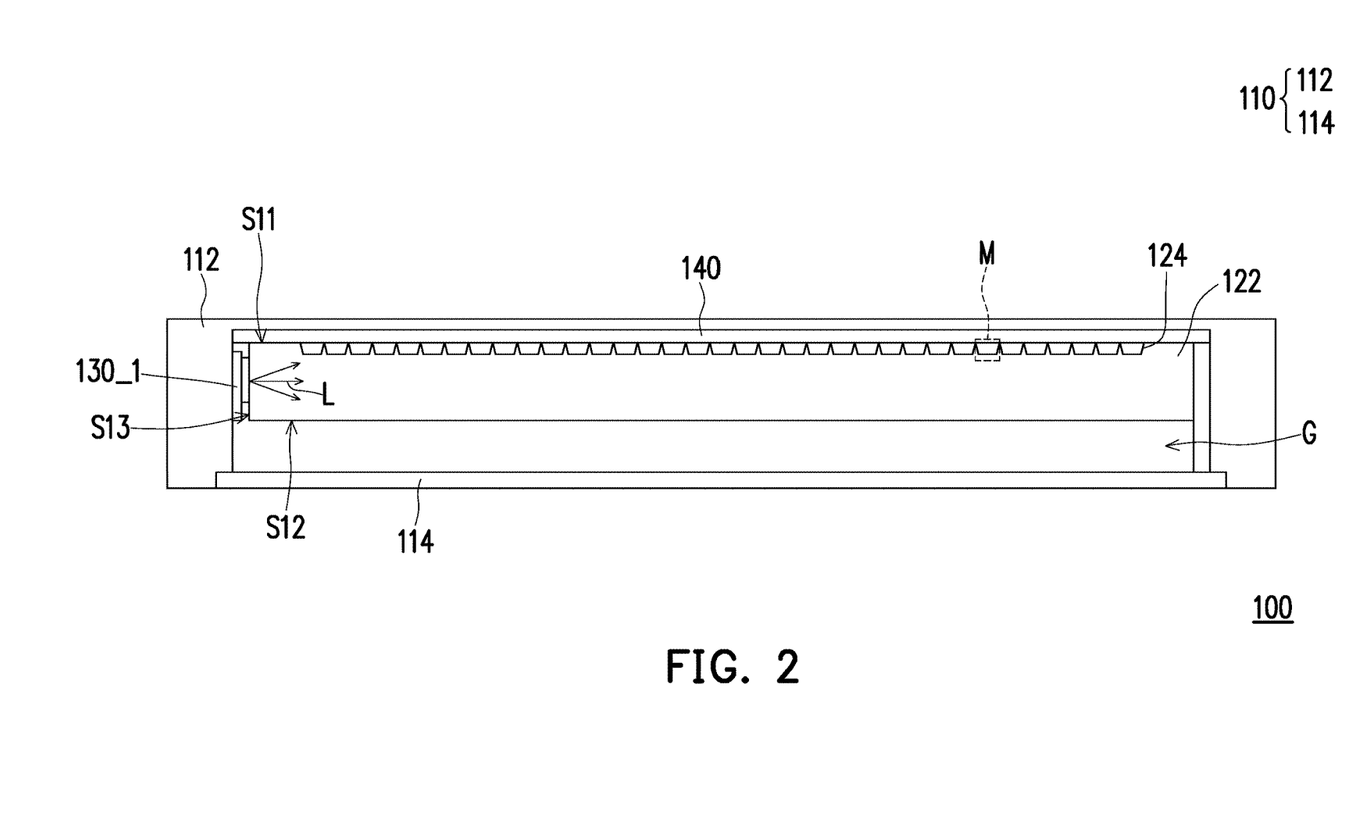
FIG. 2 is a schematic cross-sectional view taken along a line A-A' of the light source module of FIG. 1.

FIG. 1 is a schematic top view of a light source module according to an embodiment of the invention. FIG. 2 is a schematic cross-sectional view taken along a line A-A' of the light source module of FIG. 1. With reference to FIG. 1 and FIG. 2, in this embodiment, a light source module 100 includes a casing 110, a light guide plate 120, at least one light emitting element 130, and a reflector 140. The casing 110 has an internal space G, and the reflector 140, the light guide plate 120, and at least one light emitting element 130 are adapted to be installed in the internal space G in sequence, as shown in FIG. 2. In this embodiment, the at least one light emitting element 130 emits a light beam L toward the light guide plate 120. Next, a transmission path of the light beam L is changed through the light guide plate 120 and the reflector 140, so that angle distribution of light energy emitted by the light source module 100 is further optimized. In this embodiment, the light source module 100 is, for example, an illumination device used for road illumination and may also be an illumination device used for other purposes, the invention is not limited thereto.

To be specific, the casing 110 includes a body 112 and a protection cover plate 114. The protection cover plate 114 is made of a light transmissive material and is adapted to allow the light beam L transmitted from the internal space G to pass through. The light guide plate 120 is disposed in the internal space G of the casing 110. The light guide plate 120 includes a plate body 122 and an optical microstructure array 124. The plate body 122 has a top surface S11, a bottom surface S12, and a plurality of side surfaces S13 connected between the top surface S11 and the bottom surface S12. The reflector 140 is disposed on the top surface S11 of the plate body 122 and is adapted to reflect the light beam L transmitted toward the top surface S11 in the light guide plate 120 in a direction facing toward the protection cover plate 114. The at least one light emitting element 130 is disposed on the side surfaces S13 of the plate body 122 and is adapted to provide the light beam L from the side surfaces S13 toward the light guide plate 120.

Specifically, in this embodiment, the at least one light emitting element 130 includes a first light emitting element 130_1 and two second light emitting elements 130_2, and the first light emitting element 130_1 is located between the two second light emitting elements 130_2. In other words, the first light emitting element 130_1 is disposed on one of the side surfaces S13 of the plate body 122, and the second light emitting elements 130_2 are disposed on two side surfaces S13 adjacent to the above-mentioned side surface S13, as shown in FIG. 1. In this embodiment, the at least one light emitting element 130 is, for example, a light-emitting diode light bar (LED light bar), but the invention is not limited thereto.

The optical microstructure array 124 is located at the top surface S11 of the plate body 122 and includes a plurality of microstructure units M. In this embodiment, the microstructure units M are arranged to be connected to one another, but the invention is not limited thereto. To be specific, the microstructure units M are recessed from the top surface S11 towards the bottom surface S12 of the plate body 122 and are shaped as inverted square pyramids, and a pyramid portion of each of the inverted square pyramids is formed by at least four surfaces. A height of the microstructure units M is less than two-thirds of a thickness of the plate body 122.

Figure 3:
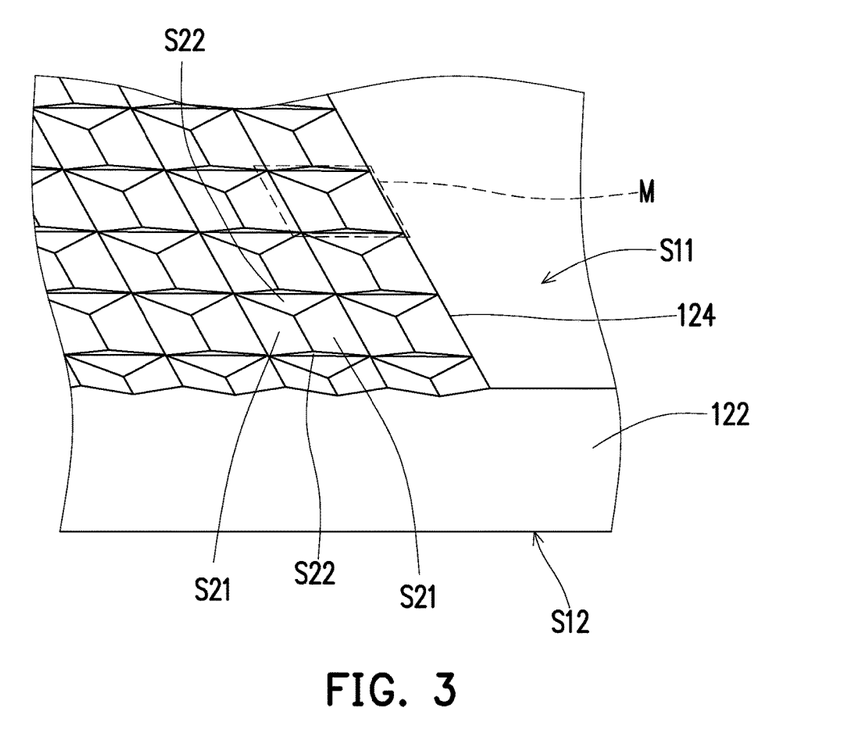
FIG. 3 is a schematic three-dimensional view of a portion of the optical microstructure array of FIG. 1.

FIG. 3 is a schematic three-dimensional view of a portion of the optical microstructure array of FIG. 1. With reference to FIG. 2 and FIG. 3, specifically, each of the microstructure units M includes two opposite first surfaces S21 and two opposite second surfaces S22 arranged in an alternating manner. Further, in each of the microstructure units M, angles included between the two first surfaces S21 and the top surface S11 of the plate body 122 are identical, and angles included between the two second surfaces S22 and the top surface S11 of the plate body 122 are identical. In this embodiment, the angles included between the two first surfaces S21 and the top surface S11 are different from the angles included between the two second surfaces S22 and the top surface S11. Therefore, the two first surfaces S21 or the two second surfaces S22 are triangular-shaped, and the other ones are quadrilateral-shaped, as shown in FIG. 3 That is, the two first surfaces S21 or the two second surfaces S22 are connected to each other, and the other ones are not connected to each other.

To be specific, the angles included between the first surfaces S21 and the top surface S11 are between 1 degree and 15 degrees, and the angles included between the second surfaces S22 and the top surface S11 are between 20 degrees and 89 degrees in this embodiment. For instance, in this embodiment, the angle included between each of the first surfaces S21 and the top surface S11 is 5 degrees, and the angle included between each of the second surfaces S22 and the top surface S11 is 20 degrees. Hence, when the light emitting element 130 provides the light beam L toward the plate body 122, a portion of the light beam L is transmitted to each of the microstructure units M in a side direction or in an oblique direction. The microstructure units M or the microstructure units M along with the reflector 140 then reflect and transmit the portion of the light beam L toward the bottom surface S12 of the plate body 122, so as to generate an illumination light beam. In this way, light type distribution of the light beam L transmitted from the light source module 100 is further optimized. In other embodiments, the first surfaces S21 and the second surface S22 may be free-form curved surfaces, and the invention is not limited thereto.

Figure 4:
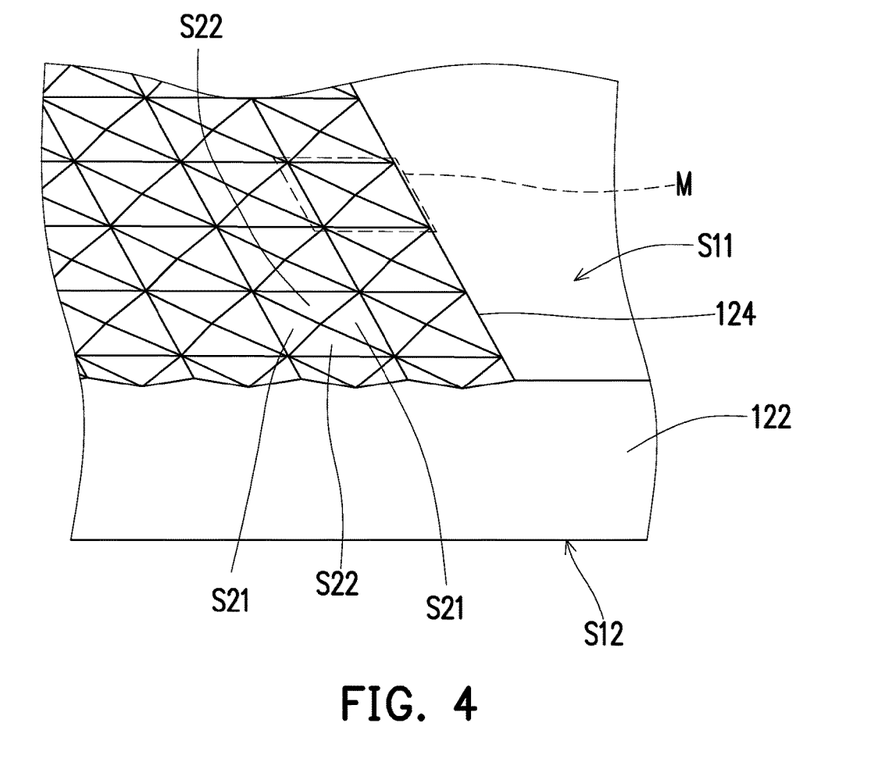
FIG. 4 is a schematic three-dimensional view of a portion of the optical microstructure array according to another embodiment of the invention.
Figure 5:
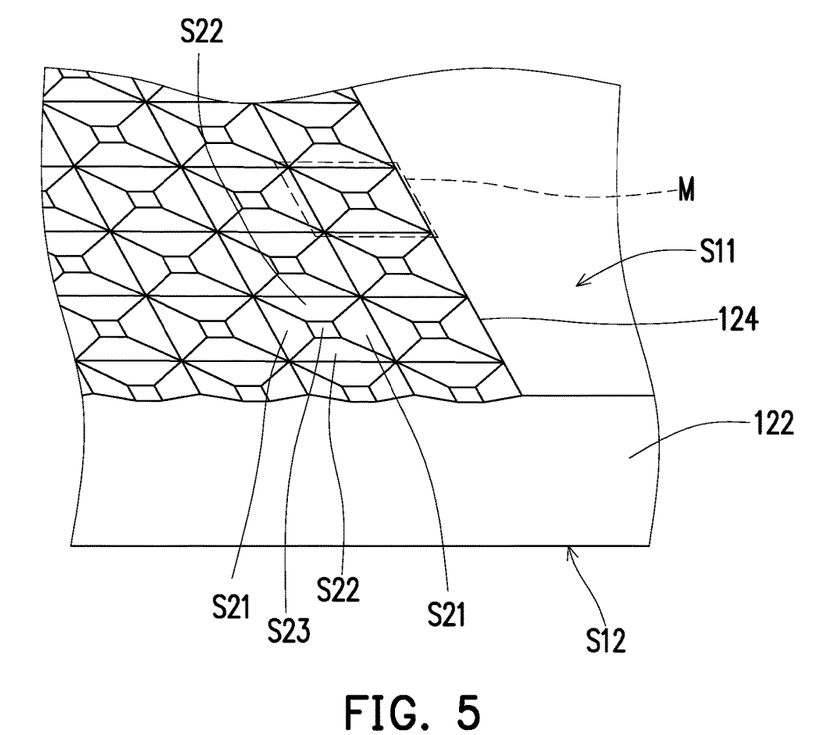
FIG. 5 is a schematic three-dimensional view of a portion of the optical microstructure array according to another embodiment of the invention.

FIG. 4 is a schematic three-dimensional view of a portion of the optical microstructure array according to another embodiment of the invention. FIG. 5 is a schematic three-dimensional view of a portion of the optical microstructure array according to another embodiment of the invention. With reference to FIG. 4 and FIG. 5, in some embodiment, however, the angles included between the first surfaces S21 and the top surface S11 may be identical to the angles included between the second surfaces S22 and the top surface S11. Hence, in these embodiments, the two first surfaces S21 and the two second surfaces S22 are connected to one another, and a vertex is formed at a junction of the surfaces, as shown in FIG. 4. Alternatively, a third surface S23 connected between the two first surfaces S21 and the two second surfaces S22 is thereby formed. The third surface S23 is parallel to the top surface S11 of the plate body 122, but the invention is not limited thereto. In some embodiments, an angle may also be provided between the third surface S23 and the top surface S11 of the plate body 122, and the invention is not limited thereto.

Besides, in some embodiments, the microstructure units M may be different from one another. To be specific, in the different microstructure units M, the angles included between the two first surfaces S21 and the top surface S11 are different from each other. Alternatively, the angles included between the two second surfaces S22 and the top surface S11 are different from each other. In other words, one single optical microstructure array 124 may include different microstructure units M. For instance, in one embodiment, the angles included between the two first surfaces S21 and the top surface S11 change in different positions in different microstructure units M. Alternatively, the angles included between the two second surfaces S22 and the top surface S11 change in different positions in different microstructure units M. Hence, the microstructure units M are arranged in a gradient-like manner, and that the microstructure units M at two opposite sides of the optical microstructure array 124 are different, so as to be applied to illuminate road surfaces of different types.

With reference to FIG. 1 and FIG. 2 again, in this embodiment, the side surface S13 in the plate body 122 corresponding to the light emitting element 130 may further include a matte structure, so as to increase light emitting efficiency of the light source module 100. Specifically, in this embodiment, a sandblasting process or a polishing process may be performed on the side surface S13 of the plate body 122, so as to mat the side surface S13 to increase surface roughness. As such, scattering is generated when light provided by the light emitting element 130 enters the side surface S13. In this way, the light emitting efficiency of the light source module 100 is further increased. In other embodiments, all the side surfaces S13 may be matted to increase surface roughness, and the invention is not limited thereto.

Figure 6:
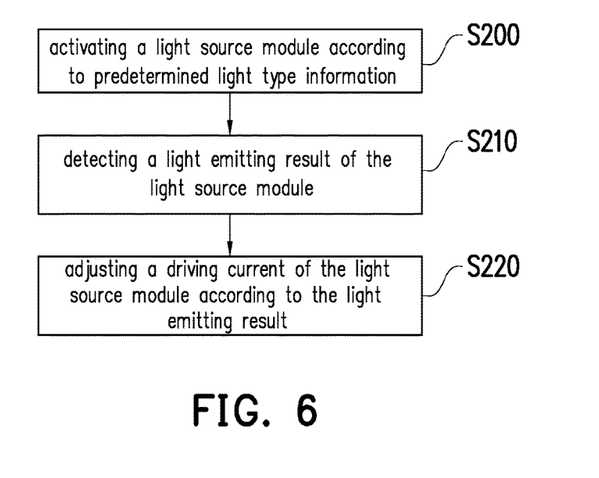
FIG. 6 is an adjustment method of a light source module according to an embodiment of the invention.

FIG. 6 is an adjustment method of a light source module according to an embodiment of the invention. With reference to FIG. 1, FIG. 2, and FIG. 6 together, an adjustment method of a light source module is provided by the present embodiment and may at least be applied to the light source module 100 depicted in FIG. 1. The light source module 100 depicted in FIG. 1 is thereby taken as an example for illustration herein, but the invention is not limited thereto.

In the adjustment method of the light source module 100 provided by the present embodiment, step S200 is performed first, and the light source module 100 is activated according to predetermined light type information. To be specific, the light source module 100 is activated to provide an illumination light ray of a predetermined light type, and the predetermined light type information stored in a data base includes driving current information of a plurality of light emitting elements 130 in the light source module 100. Next, step S210 is performed after the foregoing step S200 is completed, a light emitting result of the light source module 110 is detected. Specifically, in this step, the light type distribution of the illumination light ray emitted by the light source module 110 is detected by a detection device.

Next, step S220 is performed after step S210 is completed, a driving current of the light source module 100 is adjusted according to the light emitting result. Specifically, in this step, a step of modifying the predetermined light type information according to the light emitting result and generating adjusted light type information is included, and a step of adjusting the driving current of the light source module 100 according to the adjusted light type information is also included. That is, after the detection device is used to detect the light type distribution of the illumination light ray emitted by the light source module 100, the predetermined light type information in the data base can be modified by using backend software to generate the adjusted light type information. Further, a controller in the light source module 100 is used to adjust driving currents of the light emitting elements 130 in the light source module 100 according to the adjusted light type information.

Figure 7:
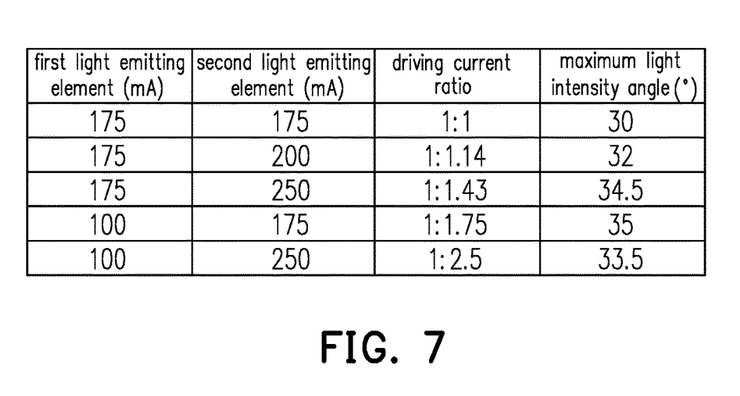
FIG. 7 is configuration data of driving currents of light emitting elements according to an embodiment of the invention.

FIG. 7 is configuration data of driving currents of light emitting elements according to an embodiment of the invention. With reference to FIG. 1, FIG. 6, and FIG. 7, in this embodiment, the above step may further include adjusting each of the driving currents of each of the light emitting elements 130 in the light source module 100. For instance, in an embodiment, a driving current ratio of the driving current of the first light emitting element 130_1 to the driving current of the two second light emitting elements 130_2 is 1:1.14, and in other embodiments, the driving current ratio of the driving current of the first light emitting element 130_1 to the driving current of the two second light emitting elements 130_2 may be 1:2.5. In other words, light emitting intensity of each of the second light emitting elements 130_2 is 1 to 3 times greater than light emitting intensity of the first light emitting element 130_1, but the invention is not limited thereto. In this way, the light type distribution of the light beam L transmitted from the light source module 100 is further optimized, and moreover, a maximum light intensity angle of light types emitted by the light source module 100 may be further adjusted through the driving current, so the light source module 100 may be applied to various different types of road environments, as shown in FIG. 7.

Therefore, in this embodiment, the light source module 100 can be activated first to provide the illumination light ray of the predetermined light type to a target road surface, and the detection device is used next to detect whether the illumination light ray satisfies a condition requirement of the target road. If the condition requirement of the target road is not satisfied, an energy ratio of the light emitting elements in the light source module is adjusted through the controller. If the condition requirement of the target road is satisfied, adjustment is stopped, and illumination is then started.

Figure 8:
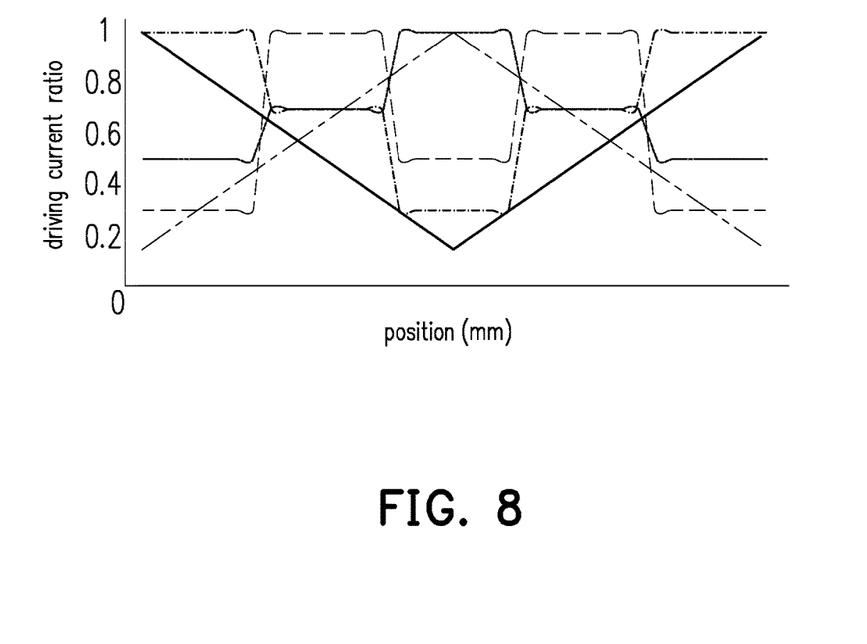
FIG. 8 is a curve graph of driving currents of different light emitting segments in the light emitting elements according to an embodiment of the invention.

FIG. 8 is a curve graph of driving currents of different light emitting segments in the light emitting element according to an embodiment of the invention. With reference to FIG. 1, FIG. 6, and FIG. 8, in addition, in this embodiment, the step of adjusting each of the driving currents of each of the light emitting elements 130 in the light source module 100 may further include adjusting each driving current of each of a plurality of light emitting segments in each of the light emitting elements 130. For instance, each of the light emitting elements 130 may be further divided into five light emitting segments, and each of the light emitting segments has a driving current different from one another. In some embodiments, the driving currents corresponding to the light emitting segments may be identical driving currents or variable driving currents, for example, linear variation or discontinuous variation, as shown in FIG. 8. That is, in this embodiment, the first light emitting element 130_1 or each of the two second light emitting elements 130_2 has a plural light emitting segments, and light emitting intensity of the light emitting segments is not completely identical. In other words, in the light source module 100 of this embodiment, each of the light emitting segments of one single light emitting element 130 can be adjusted corresponding to variation of the environments, illuminated road surfaces, or other objects. In this way, the light type distribution of the light beam L transmitted from the light source module 100 is further optimized. A favorable light energy utilization rate is further achieved at the same time.

Figure 9:
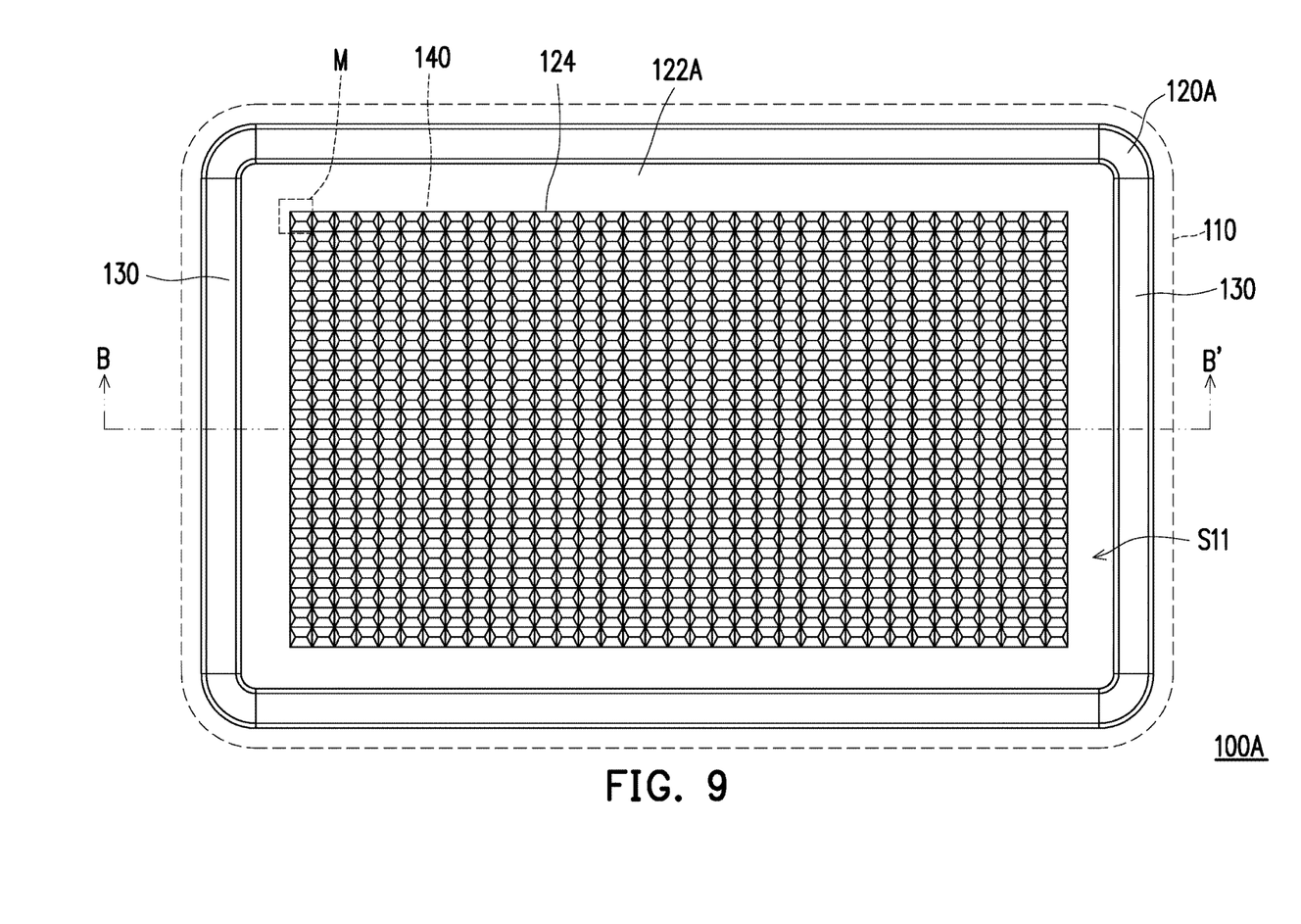
FIG. 9 is a schematic top view of a light source module according to another embodiment of the invention.
Figure 10:
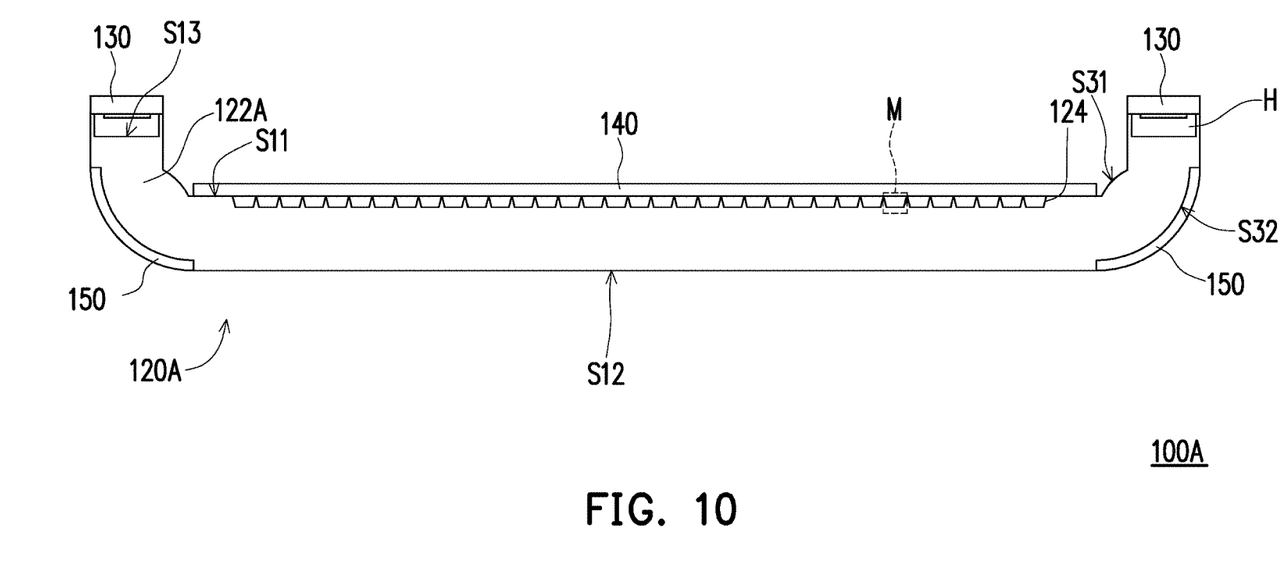
FIG. 10 is a schematic cross-sectional view taken along a line B-B' of the light source module of FIG. 9.
Figure 11:
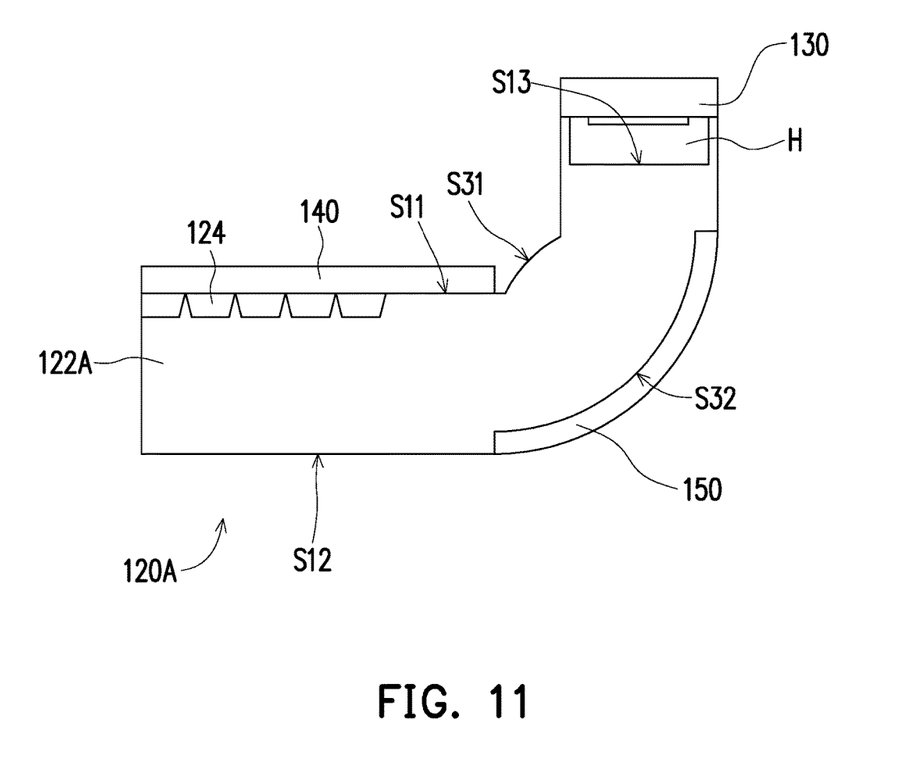
FIG. 11 is a schematic enlarged view of a portion of the light source module of FIG. 10.

FIG. 9 is a schematic top view of a light source module according to another embodiment of the invention. FIG. 10 is a schematic cross-sectional view taken along a line B-B' of the light source module of FIG. 9. FIG. 11 is a schematic enlarged view of a portion of the light source module of FIG. 10. With reference to FIG. 9 to FIG. 11, a light source module 100A of this embodiment is similar to the light source module 100 of FIG. 1. The difference therebetween is that a plate body 122A of a light guide plate 120A in the light source module 100A is different from the plate body 122 of FIG. 1 in this embodiment. Specifically, an edge of a top surface S11 of the plate body 122A is curved in a direction away from a bottom surface S12 to form a first arc surface S31, and an edge of the bottom surface S12 is curved in a direction facing toward the top surface S11 to form a second arc surface S32. In other words, the edges of the plate body 122A are curved and are curved in the direction facing toward the top surface S11. Therefore, the at least one light emitting element 130 is disposed on a side surface S31 of the plate body 122A and emits the light beam L in a direction facing toward the bottom surface S12. To be specific, in this embodiment, a gap H is provided between the light emitting element 130 and the side surface S31, but the invention is not limited thereto.

In addition, the light source module 100A further includes a reflection member 150 disposed on the second arc surface S32. The reflection member 150 may be formed on the second arc surface S32 through attaching a reflecting sheet or film coating, but the invention is not limited thereto. Therefore, when the light emitting element 130 emits light, the light beam L makes entry from the side surface S13 of the plate body 122A and is transmitted to the optical microstructure array 124 through reflection performed by the reflection member 150 and a total reflection effect provided by the first arc surface S31. In this way, the light emitting element 130 may be horizontally attached onto the casing 110, so an installation process is simplified and a heat dissipation area is increased, and that life span of the light guide plate 120A is further increased. In addition, since the edges of the light guide plate 120A are curved, a greater number of the light emitting elements 130 of various types or of larger volume can thereby be disposed.

Figure 12:
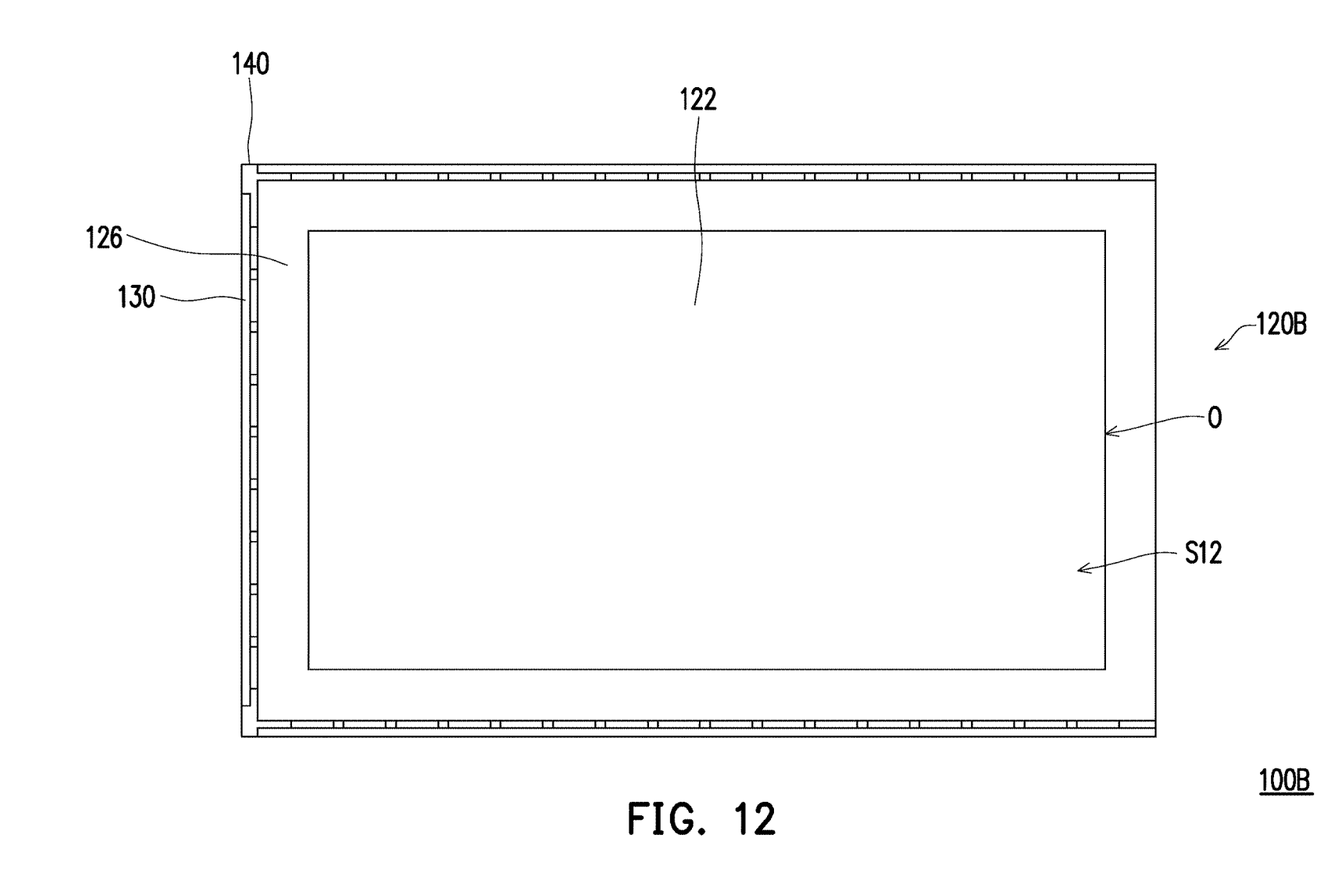
FIG. 12 is a schematic top view of a light source module according to another embodiment of the invention.

FIG. 12 is a schematic top view of a light source module according to another embodiment of the invention. With reference to FIG. 12, a light source module 100B of this embodiment is similar to the light source module 100 of FIG. 1. The difference therebetween is that in the light source module 100B of this embodiment, a light guide plate 120B further includes a reflection layer 126 disposed on a bottom surface S12 of a plate body 122 to form a light output region O. Specifically, in this embodiment, the reflection layer 126, for example, has a mirror surface or is made of a white light-reflecting material and is disposed on the bottom surface S12 of the plate body 122 through coating or attaching. Further, the light output region O is formed on the bottom surface S12, so that the light beam L emitted by the light emitting element 130 is transmitted out from the light output region O on the bottom surface S12 of the plate body 122. To be specific, in this embodiment, the reflection layer 126 is a mouth-shaped structure, and the light output region O is located in the middle. Therefore, the light beam L transmitted in the plate body 122 may be reflected back into the plate body 122 through the reflection layer 126 located on an edge of the bottom surface S12 and is transmitted out of the bottom surface S12 until being transmitted to a region without the reflection layer 126 (i.e., the light output region O). In this way, light leakage at a light input side close to the plate body 122 is decreased, and light emitting efficiency of the light source module 100B is further increased as well.

In view of the foregoing, the light source module provided by the invention includes the light guide plate, and the light guide plate has the microstructure units arranged in an array. Each of the microstructure units is formed by at least two opposite first surfaces and two opposite second surfaces and are recessed from the plate body, and the angles included between the first surfaces and the top surface of the plate body and the angles included between the second surfaces and the top surface of the plate body are different. In addition, in the adjustment method of the light source module provided by the invention, the light source module may be activated according to the predetermined light type information. The light emitting result of the light source module is detected so as to adjust the driving current of the light source module. In this way, the light type distribution of the light beam transmitted from the light source module is further optimized, and moreover, the light type distribution emitted by the light source module may be adjusted through the driving current, so the light source module may be applied to various different types of road environments.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light source module, comprising:
   a casing, having an internal space;
   a light guide plate, disposed in the internal space of the casing, the light guide plate comprising:
      a plate body, having a top surface, a bottom surface, and a plurality of side surfaces connected between the top surface and the bottom surface; and
      an optical microstructure array, located at the top surface, comprising a plurality of microstructure units;
   at least one light emitting element, disposed on the side surfaces of the light guide plate; and
   a reflector, disposed on the top surface of the light guide plate, wherein the microstructure units are recessed from the top surface towards the bottom surface and are shaped as inverted square pyramids, a pyramid portion of each of the inverted square pyramids is formed by at least four surfaces, each of the microstructure units comprises two opposite first surfaces and two opposite second surfaces arranged in an alternating manner, and angles included between the two first surfaces and the top surface are identical and angles included between the two second surfaces and the top surface are identical in each of the microstructure units.

2. The light source module as claimed in claim 1, wherein the microstructure units are arranged to be connected to one another.

3. The light source module as claimed in claim 1, wherein a height of the microstructure units is less than two-thirds of a thickness of the plate body.

4. The light source module as claimed in claim 1, wherein the two first surfaces or the two second surfaces are triangular-shaped, and the other ones are quadrilateral-shaped.

5. The light source module as claimed in claim 1, wherein the angles included between the two first surfaces and the top surface are different from the angles included between the two second surfaces and the top surface.

6. The light source module as claimed in claim 1, wherein the angles included between the two first surfaces and the top surface are different from each other or the angles included between the two second surfaces and the top surface are different from each other in different microstructure units.

7. The light source module as claimed in claim 1, wherein the angles included between the two first surfaces and the top surface or the angles included between the two second surfaces and the top surface change in different positions in different microstructure units.

8. The light source module as claimed in claim 1, wherein the two first surfaces and the two second surfaces are free-form curved surfaces.

9. The light source module as claimed in claim 1, wherein the two first surfaces or the two second surfaces are connected to each other, and the other ones are not connected to each other.

10. The light source module as claimed in claim 1, wherein the two first surfaces and the two second surfaces are connected to one another.

11. The light source module as claimed in claim 1, wherein each of the microstructure units further comprises a third surface connected between the two first surfaces, and the third surface is parallel to the top surface of the plate body.

12. The light source module as claimed in claim 1, wherein the at least one light emitting element comprises a first light emitting element and two second light emitting elements, and the first light emitting element is located between the two second light emitting elements.

13. The light source module as claimed in claim 12, wherein light emitting intensity of each of the second light emitting elements is 1 to 3 times greater than light emitting intensity of the first light emitting element.

14. The light source module as claimed in claim 12, further comprising:
   a controller, adapted to individually control driving currents of the first light emitting element and the two second light emitting elements.

15. The light source module as claimed in claim 12, wherein the first light emitting element or each of the two second light emitting elements has a plurality of light emitting segments, and light emitting intensity of the light emitting segments is not completely identical.

16. The light source module as claimed in claim 1, wherein an edge of the top surface of the plate body is curved in a direction away from the bottom surface to form a first arc surface, an edge of the bottom surface is curved in a direction facing toward the top surface to form a second arc surface, and the light source module further comprises a reflection member disposed on the second arc surface.

17. The light source module as claimed in claim 1, wherein one portion of the side surfaces has a matte structure.

18. The light source module as claimed in claim 1, wherein the light guide plate further comprises a reflection layer disposed on the bottom surface to form a light output region.

19. The light source module as claimed in claim 18, wherein the reflection layer is a mouth-shaped structure.

20. An adjustment method of a light source module, comprising:
   activating a light source module according to predetermined light type information;

detecting a light emitting result of the light source module; and adjusting a driving current of the light source module according to the light emitting result.

21. The adjustment method of the light source module as claimed in claim 20, wherein the step of adjusting the driving current of the light source module according to the light emitting result further comprises:

modifying the predetermined light type information according to the light emitting result and generating adjusted light type information; and adjusting the driving current of the light source module according to the adjusted light type information.

22. The adjustment method of the light source module as claimed in claim 21, wherein the step of adjusting the driving current of the light source module according to the adjusted light type information further comprises:

adjusting each driving currents of each of a plurality of light emitting elements in the light source module.

23. The adjustment method of the light source module as claimed in claim 22, wherein the step of adjusting each of the driving currents of each of the light emitting elements in the light source module further comprises:

adjusting each driving currents of each of a plurality of light emitting segments in each of the light emitting elements.

* * * * *